Figure 1:
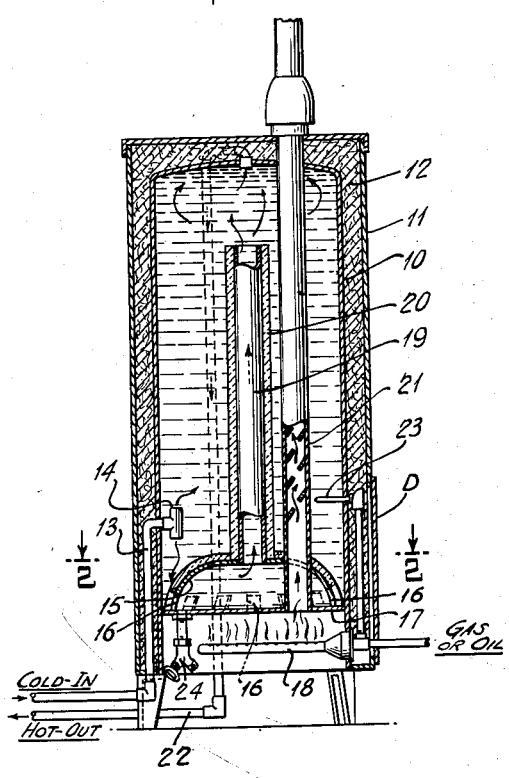

Nov. 26, 1946.          C. Z. ALEXANDER          2,411,675
                           WATER HEATER
                        Filed Jan. 30, 1945

INVENTOR
CARL Z. ALEXANDER.
BY
ATTORNEY

Patented Nov. 26, 1946

2,411,675

UNITED STATES PATENT OFFICE 2,411,675

WATER HEATER

Carl Z. Alexander, Springfield, N. J.

Application January 30, 1945, Serial No. 575,312

1 Claim. (Cl. 122—17)

This invention relates to improvements in water heaters.

It is an object of this invention to provide a water heater provided with a novel structure for the heating of water and for discharging the same interiorly of the water tank adjacent the top thereof so that the same may be drawn off when desired.

A further object of the invention is to provide a water heater wherein the structure utilized for heating and circulating water internally of the tank is positive, simple and efficient in operation.

A further object of the invention is to provide a water heater incorporating novel features of such structure enhancing its durability and efficiency.

Figure 3:
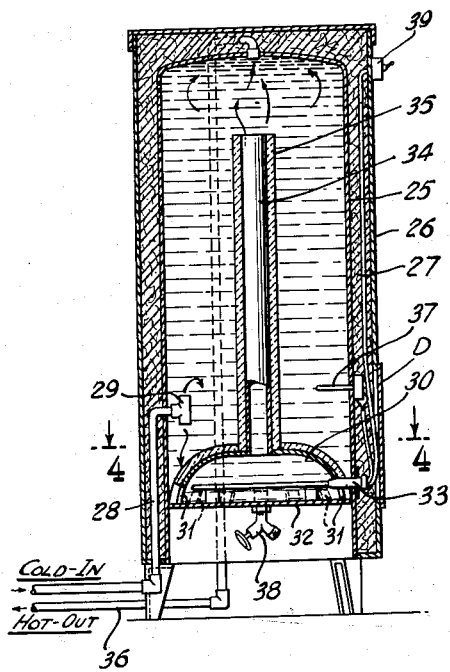
Figure 2:
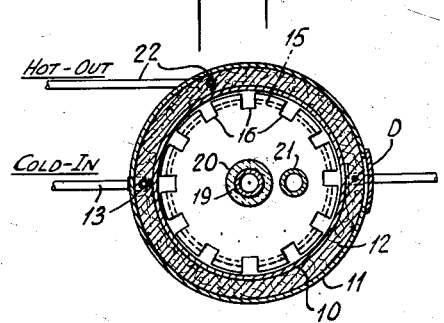
Figure 4:
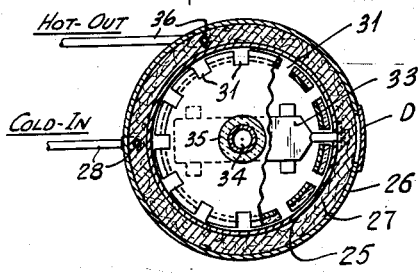

These and other advantageous objects, which will later appear, are accomplished by the simple and practical construction and combination of parts hereinafter described and more particularly shown in the drawing, illustrating embodiments of my invention, and in which:

Fig. 1 is a vertical transverse sectional view of a water heater embodying my invention, shown partly fragmentarily, Fig. 2 is a horizontal sectional view thereof taken on line 2—2 of Fig. 1, Fig. 3 is a vertical transverse sectional view, partly fragmentary, of another form of storage water heater embodying my invention, and Fig. 4 is a horizontal sectional view thereof taken on line 4—4 of Fig. 3.

In Fig. 1 the water heater of my invention is shown to comprise a tank 10 which may be of any desired or convenient dimensions, said tank being enclosed within an outer casing 11 with insulation 12 therebetween.

Cold water enters the tank 10 through the pipe 13 which preferably terminates internally of the tank in a baffle end 14 to prevent turbulence of the water at its point of entry. The cold water passes to the interior of the chamber 15 which is preferably dome shaped, through the lower marginal slots 16 of said chamber, the bottom of the chamber being sealed by the plate 17 or the like, the top of the chamber communicating with the chamber discharge pipe 19.

A heating unit, such as the heater manifold 18, which may be utilized for burning of gas or oil or the like, is disposed below said plate 17, a flue pipe 21 passing through the plate 17, chamber 15, and the tank 10 or being otherwise located for the discharge of burnt gases from the manifold 18. The chamber pipe 19 and the chamber 15 are preferably externally insulated as shown, at 20.

In operation, cold water enters the tank through the pipe 13, passes through the lower marginal slots 16 into the chamber 15, where it is heated as above described, and passes thence through the chamber pipe 19 to the top of the tank, whence it may be drawn off in any convenient manner, as for example, by a hot water pipe 22 connected with the top of the tank as shown in Fig. 1 of the drawing, and preferably passing between the tank and casing 11 and thence exteriorly of the casing as shown. The tank 10 is preferably provided with a thermostat 23, the thermostatic element of which projects into the tank to be actuated responsive to the temperature of the water, said thermostat being connected with the manifold 18 to regulate the passage of gas or oil or other heating medium therethrough responsive to the temperature of the water. The chamber 15 is preferably provided with a drain 24 as shown in Fig. 1. It will be apparent that the structure described is compact and self-sufficient and provides for efficient and rapid heating of water in a simple and effective manner.

If desired, an electric heating unit may be substituted for manifold 18 to heat the chamber 15, for example, as illustrated in Fig. 3, wherein the tank 25 is provided with external casing 26, with insulation 27 therebetween. A cold water pipe 28 projects into the tank and terminates in the baffle end 29, said tank having a chamber 30 provided with a chamber pipe 34, chamber 30 having slots 31 at the lower marginal edges thereof and being closed at the bottom by a plate 32. The heater unit 33 preferably comprises a unit which passes through the tank and is sealed in any desired or convenient manner at said point of passage and projects into the chamber 30. Said heater unit is preferably removable for cleaning or repair or replacement. The heater unit may utilize any desired or convenient resistance, induction or other electrical form of heating and may be electrically connected with a control unit 39 fixed to the casing 26. The chamber 30 and chamber pipe 34 are preferably insulated as at 35. The tank 25 is provided with a hot water outlet pipe 36 connected thereto as shown. A thermostat unit 37 projects into the tank and is connected with the heater unit 33 to control the flow of current to said heater unit as required. The chamber 30 is provided with a drain 38. To afford access to the interior of casings of Figs. 1 and 3 enclosing the tanks, the former may be provided with door sections D where required. It will be understood that the slots at the lower marginal edges of the chambers continue through the insulation of said chambers as shown in the drawing.

In the form shown in Fig. 3, the slots 31 preferably terminate at a lower plane than the plane at which the heating element 33 is disposed in the chamber 30, said heating element being further disposed in said chamber in a plane parallel to that of the plate 32 and suitably supported thereon.

The insulation of the water-heating chambers 15 and 30 and chamber discharge pipes 19 and 34 (the latter terminating adjacent the top of the tank) serves to maintain the temperature of the heated water from the effect of the unheated water in the tank. The heated water is thus effectively thermally protected and sealed from its point of heating to its point of discharge from the tank, reducing heat losses to a minimum.

Having thus described my invention what I claim as new and desire to secure by Letters Patent is:

A water heater comprising a tank and casing secured together with the tank positioned interiorly of the casing in spaced relation thereto, insulation means intermediate the tank and casing, a cold water inlet pipe projecting into the tank, a baffle fixed to the end of said pipe interiorly of said tank to preclude turbulence of the water at its point of entry into the tank, a plate closing the bottom of the tank, a chamber of dome-shaped cross section disposed on said plate in said tank, marginal slots at the lower edges of said chamber, a discharge pipe communicating with the top of said chamber and terminating interiorly of said tank adjacent the top thereof, said discharge pipe and chamber being externally insulated, a heating unit disposed in said heater for heating said chamber, a flue pipe extending completely through the water tank from the plate through the top of the water tank and casing and a thermostat projecting into the tank to be actuated responsive to the temperature of the water, said thermostat being connected with said heating unit to regulate the same responsive to the said temperature of the water.

CARL Z. ALEXANDER.